(12) United States Patent
Jablonsky

(10) Patent No.: US 6,843,914 B2
(45) Date of Patent: Jan. 18, 2005

(54) FILTRATION APPARATUS AND PROCESS

(76) Inventor: Julius James Jablonsky, 1610 Hedgewood Rd., Hatfield, PA (US) 19440

( * ) Notice: Subject to any disclaimer, the term of this patent is extended or adjusted under 35 U.S.C. 154(b) by 0 days.

(21) Appl. No.: 10/317,886

(22) Filed: Dec. 12, 2002

(65) Prior Publication Data

US 2003/0111426 A1 Jun. 19, 2003

Related U.S. Application Data

(60) Provisional application No. 60/341,212, filed on Dec. 13, 2001.

(51) Int. Cl.[7] .............................................. B01D 35/20
(52) U.S. Cl. .................... 210/243; 210/391; 204/665
(58) Field of Search ................................ 210/748, 780, 210/784, 785, 216, 217, 243, 384, 391, 402; 204/665

(56) References Cited

U.S. PATENT DOCUMENTS

| | | | | |
|---|---|---|---|---|
| 2,054,273 A | * | 9/1936 | Subkow | 204/562 |
| 2,300,283 A | * | 10/1942 | Fisher | 204/560 |
| 3,788,470 A | * | 1/1974 | Pelmulder et al. | 210/785 |
| 3,957,650 A | * | 5/1976 | Petrushkin et al. | 210/380.1 |
| 4,302,330 A | * | 11/1981 | Cusato, Jr. | 210/107 |
| 4,693,879 A | * | 9/1987 | Yoshimura et al. | 423/449.2 |
| 5,039,347 A | * | 8/1991 | Hindstrom et al. | 134/1 |
| 5,106,468 A | * | 4/1992 | Chimenti | 204/564 |
| 5,653,816 A | * | 8/1997 | Ekberg | 134/1 |
| 6,221,255 B1 | * | 4/2001 | Vadoothker | 210/739 |
| 6,284,136 B1 | * | 9/2001 | Tuori et al. | 210/331 |

* cited by examiner

Primary Examiner—Frank M. Lawrence
(74) Attorney, Agent, or Firm—Howson and Howson

(57) ABSTRACT

Performance of a rotating filter element for removing particulate matter from a liquid is enhanced by applying acoustic energy in the ultrasonic frequency range to the filter element by plural transducers affixed to the exterior of a bowl surrounding the rotating filter element. The bowl and filter element can be electrically isolated from each other and connected to a D.C. power supply for further enhancement of filter performance. The ultrasonic transducers, the power supply, and a discharge valve can all be operated by a controller, responsive to a sensor which senses the pressure drop across the filter element.

3 Claims, 2 Drawing Sheets

FILTRATION APPARATUS AND PROCESS

CROSS-REFERENCE TO RELATED APPLICATION

This application claims priority based on U.S. Provisional patent application 60/341,212, filed Dec. 13, 2001.

FIELD OF THE INVENTION

This invention relates to filtration, and more specifically to a improvements in a filtration apparatus in which a hollow filter element is disposed inside a bowl, and fluid is passed from the exterior of the filter element to the interior while the element is rotated in order to prevent accumulation of solid matter on the filter element.

BACKGROUND OF THE INVENTION

U.S. Pat. No. 4,302,330, dated Nov. 24, 1981, describes a typical filtration apparatus of the kind to which this invention relates. The apparatus provides for the intermittent rotation of a cylindrical filter element about its axis in order to effect "spin-cleaning." Solid matter filtered out of the fluid is thrown off the filter element by inertia. Similar filters are known, in which the filter element is rotated continuously as filtration takes place, in order to avoid accumulation of solid matter on the filter element.

When a filter element, made from ceramic, diatomaceous earth, stainless steel, or any of various polymeric materials, is rotated during filtration, it can be used for extended periods of time, and becomes effectively non-disposable. Non-disposability is a significant advantage because of the high cost of these advanced filtration materials.

Sometimes, however, difficult situations are encountered, in which even a rotating filter element will become fouled, and require removal for cleaning, or replacement. In such a situation, either the process must be shut down temporarily, or an auxiliary filter must be provided in order for the process to continue.

BRIEF SUMMARY OF THE INVENTION

An object of this invention is to extend the operation of a rotating filter, so that, even when it is used to filter materials that would otherwise foul the filter element, it can be operated over long intervals without significant interruptions. Other objects of the invention include the avoidance of replacement of filter elements, the avoidance of backflushing, the shortening of cleaning cycles, reduction in the cost of operation, and the ability to maintain flux levels by automated control.

The filtration apparatus in accordance with the invention comprises a bowl having a fluid inlet port, and a filter element situated inside the bowl. The filter element is hollow, has an interior space, and is mounted for rotation about an axis. Driving means are provided for rotating the filter element about said axis, and a fluid outlet port is in communication with the interior of the filter element. In accordance with an embodiment of the invention, at least one ultrasonic transducer is arranged to direct acoustic energy at an ultrasonic frequency toward the filter element. As an alternative to the ultrasonic transducer, or as an additional measure, the filter element is made electrically conductive, and an electrical power supply is coupled to the filter element and an electrode for establishing an electrical potential difference between the electrode and the exterior surface of the filter element. The bowl and the filter element are electrically insulated from each other, so that the potential difference can be maintained. If the power supply is directly connected both to the electrode and to the filter element, electrolytic generation of gas bubbles at the external surface of the filter element aids in dislodging particulate matter from the filter element. Electrostatic repulsion of particles from the exterior of the filter element can also be achieved, provided that the polarity of the filter element is the same as that of the particles. Insulation may be provided so that gas bubbles are not produced, but electrostatic repulsion keeps suspended particles away form the exterior surface of the filter element.

In the filtration process, a fluid is passed inwardly through the hollow, rotating, filter element, and simultaneously, acoustic energy at an ultrasonic frequency is directed toward the filter element. Alternatively, or concurrently with the application of acoustic energy, an electrical potential difference may be established between the filter element and an electrode external to the filter element, and separated from the filter element by the fluid. In a preferred embodiment the bowl itself serves as the electrode.

The application of ultrasonic acoustic energy to the filter element, which is preferably carried out by plural transducers mounted on the outside of the bowl, aids in maintaining flux levels across the filter element. The establishment of the potential difference between the filter element and the bowl or other electrode aids in cleaning the pores of the filter by producing gas bubbles at the surface of the filter element. By selecting the appropriate polarity, depending on the electrical charge of the solid particles in the fluid, the charge can be made to repel the particles from the filter element to avoid fouling.

The operation of the filtering apparatus can be controlled by a microprocessor, by a programmed logic controller, or by a logic circuit composed of discrete logic elements. When the control senses a decrease in flux, the ultrasonic energy, and/or the electrical charge, can be applied to maintain the desired filtration rate.

The invention is potentially useful in many domestic and industrial filter applications, and has particular utility as a domestic water supply filter for installation in homes.

Other objects, details and advantages of the invention will be apparent from the following detailed description when read in conjunction with the drawings.

DETAILED DESCRIPTION OF THE PREFERRED EMBODIMENT

Figure 1:
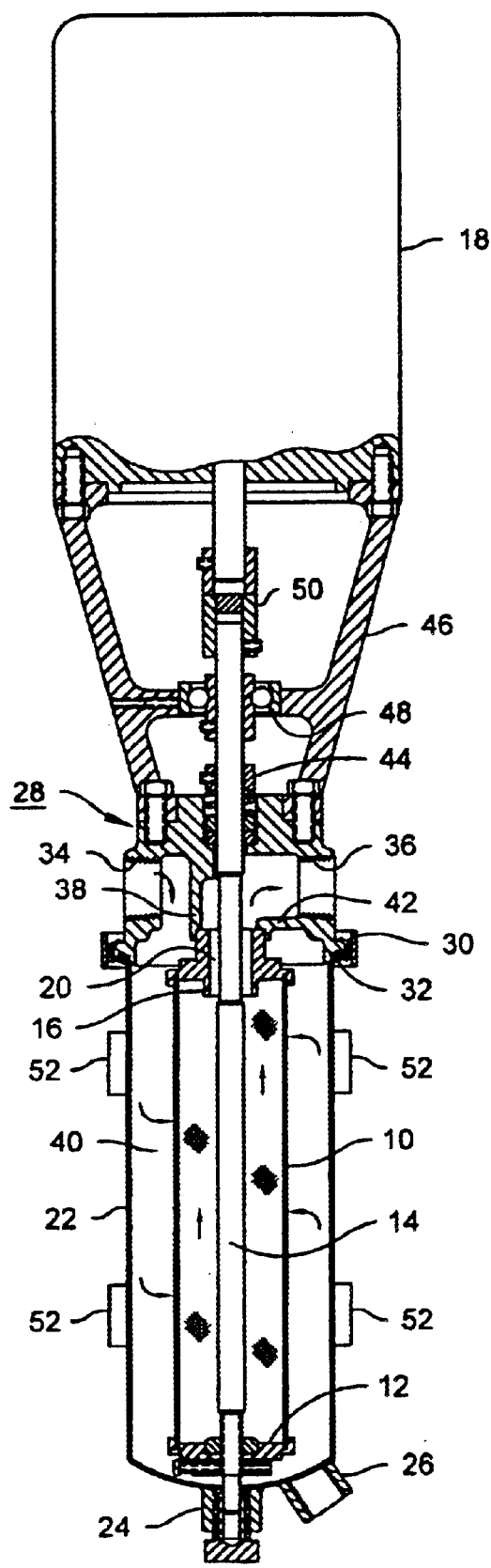
FIG. 1 is a cross-sectional view of a filtration apparatus in accordance with a first embodiment of the invention.

As shown in FIG. 1, the filtration apparatus comprises a filter element 10, which is preferably in the form of a hollow, rigid, elongated cylinder. The filter element may be composed of any of various filter materials, such as ceramics, diatomaceous earth, porous stainless steel, or any of various polymers. Basic reverse osmosis, nano, ultra, micro and standard membrane filters can be used. Even conventional woven or hot melt cartridge filters can be utilized in this filtration apparatus. The shape of the filter element 10 need not be cylindrical. For example, its inner and outer surfaces can be in the form of surfaces of revolution such as a frusto-conical surface, a partial sphere, or a partial ellipsoid.

The filter element need not even be a surface of revolution. For example it may have vertically extending ribs in order to achieve a larger surface area. Since it rotates, however, it should be made symmetrical about the axis of rotation in order to avoid excessive vibration.

The filter element 10 is closed at the bottom by an end cap 12, which is fixed to a shaft 14, which extends lengthwise through the filter element and through a sleeve 16, disposed in an end cap at the opposite end of the filter element, to a drive motor 18. The sleeve is spaced from the shaft to provide a flow passage 20, leading from the interior of the filter element to the exterior.

The filter element is situated inside an enclosure 22, known as a bowl. The bowl is preferably made of metal. The shaft is rotatably supported by a bearing 24 at the lower end of the bowl, adjacent a drain port 26, which can be closed off by a valve (not shown).

The bowl 22 is clamped to a head 28 by a quick disconnect clamp 30, and a gasket 32 is provided as a seal between the bowl and the head. A fluid inlet port 34 and a fluid outlet port 36 are provided in the head. A baffle 38 in the head separates the inlet and outlet ports, and cooperates with sleeve 16 so that fluid entering through the inlet port 34 is directed into the space 40 between the inner wall of the bowl 22 and the outside of the filter element 10. A second baffle 42, built into the head, cooperates with baffle 38 to direct fluid from the interior of the filter element out through port 36.

A shaft seal 44 is provided in the head. A motor support 46, bolted to the top of the head includes a shaft support bearing 48. The shaft 14 is connected to the motor 18 through a coupling 50.

Ultrasonic transducers 52, for example magnetostriction transducers, are provided on the exterior wall of the bowl.

In the operation of the filter apparatus of FIG. 1, liquid containing solid matter to be removed is introduced through port 34, and passes into the bowl and radially inwardly through the wall of the filter element into the interior of the filter element, and from there upward through passage 20 and outward through passage 36. The filter element is rotated by motor 18 as flow takes place. Solid matter which would otherwise accumulate on the exterior of the filter element 10 is thrown off in a direction tangential to the filter element as it rotates. Consequently, most of the solid particles in the incoming liquid remain in suspension in the liquid within space 40. When the concentration of solid particles in the liquid in space 40 reaches a sufficiently high level to have an adverse effect on filtration efficiency, port 26 can be opened to allow the contaminated liquid in space 40 to drain off. In a domestic water supply system, drainage through port 26 can be carried out in a short time, while the filter is operating, without a significant loss of water.

The transducers may be operated at appropriate times to direct acoustic energy at an ultrasonic frequency through the wall of the bowl, and through the liquid in space 40, toward the filter element 10. The ultrasonic acoustic energy, when applied to the exterior surface of the filter element, aids in maintaining a desired flux level through the filter.

Figure 2:
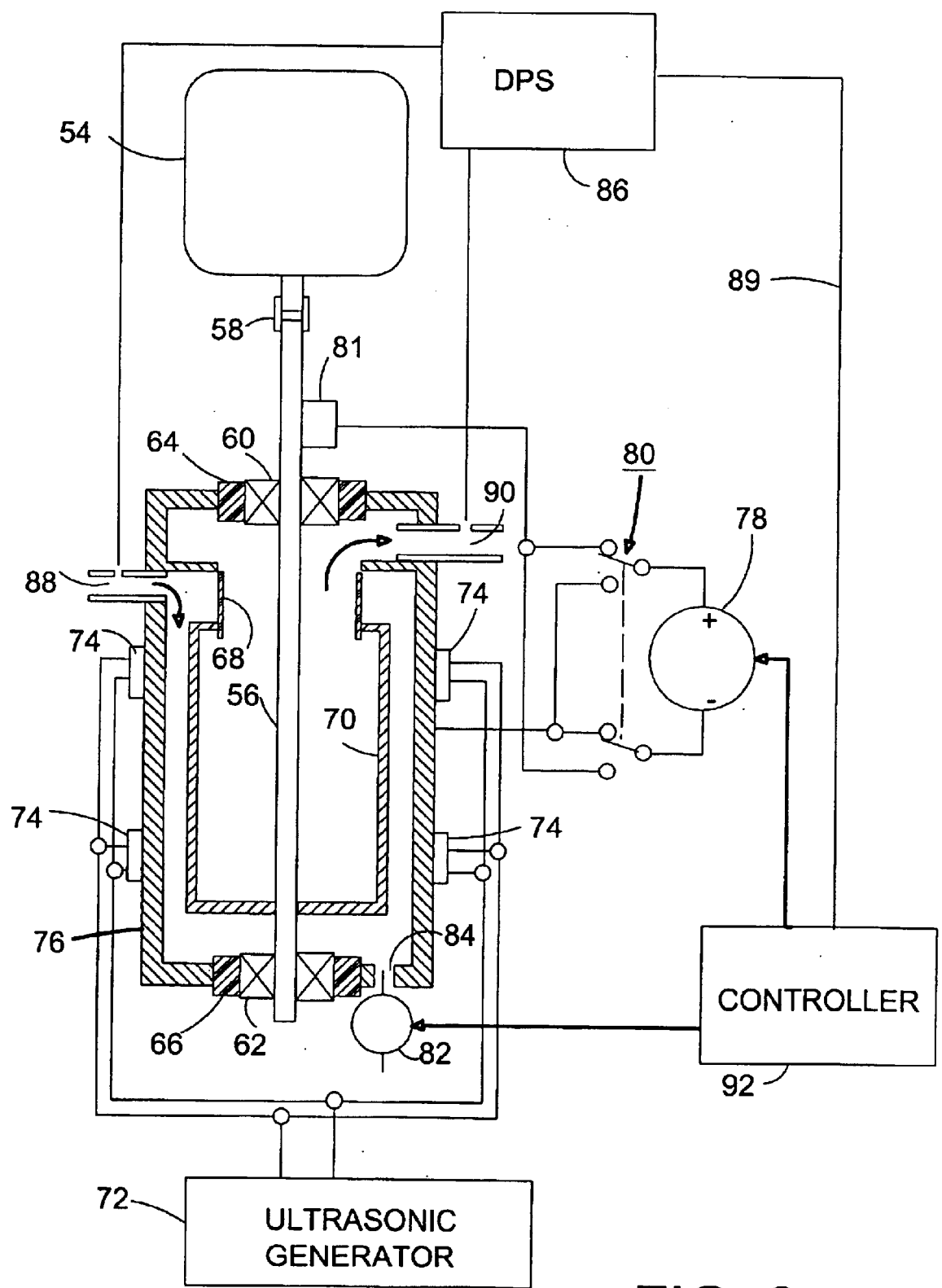
FIG. 2 is a cross-sectional schematic view, of a filtration apparatus in accordance with a second embodiment of the invention.

FIG. 2, is a schematic view of a second embodiment, which is similar to the embodiment of FIG. 1 except that certain components are electrically insulated from others so that an electrical potential difference can be established between the filter element and the bowl. Thus, in this embodiment, the motor 54 is insulated from the shaft 56 by an insulated coupling 58. Shaft bearings 60 and 62 are insulated from the bowl by insulators 64 and 66 respectively. Sleeve 68, which rotates with the filter element 70, is preferably formed of an electrical insulating material.

An ultrasonic generator 72 is connected to drive ultrasonic transducers 74 mounted on the outer wall of the bowl 76.

A D.C. power supply 78 is connected, through a D.P.D.T. polarity reversing switch 80, to the bowl 76, and to a brush 81 which contacts the shaft 56, thereby making an electrical connection, through the shaft, to the filter element, which in this case, is conductive. Stainless steel, or a conductive ceramic filter material are suitable. A normally closed solenoid valve 82 is provided to open drain port 84, when activated. A differential pressure sensor 86 is connected through tubes to inlet port 88 and outlet port 90, and provides an electrical signal in line 89 which corresponds to the pressure drop across the filter. The sensor 86 can be simply a switch, in which case the signal merely indicates whether the pressure drop is above or below a predetermined level. Alternatively the sensor 86 can provide an analog signal or a multi-level or encoded digital signal that corresponds to the pressure drop.

The signal provided by the sensor 86 is delivered to a controller 92. The controller can be any of various available controllers, such as a microprocessor controller, a programmed logic array, or a discrete logic controller. Its three outputs are delivered respectively to the D.C. power supply 78, to the ultrasonic generator 72 and to valve 82.

In operation, depending on how the controller is programmed, the ultrasonic generator, the power supply, or both, can be activated when the pressure drop reaches a preselected level or the ultrasonic generator and power supply can be activated sequentially at different levels of pressure drop. When the pressure drop reaches a level indicating that the concentration of solid matter in the space between the filter element and the inside wall of the bowl is excessive, the controller can open valve 82 for a short interval, allowing the liquid containing solid matter to be discharged through port 84.

The solids and liquid discharged through port 84 can be delivered to a filter press (not shown), and the liquid can be recycled from the filter press to the inlet port 88 of the filtration apparatus.

When the electrical power supply is used, gas bubbles generated at the surface of the filter element aid in dislodging particles from the filter element, and when the filter element or other electrode is soluble, an electrocoagulation effect is also realized. The polarity reversing switch 80 should be set so that the polarity of the filter element is the same as the polarity of the suspended particles in the liquid entering the filtration apparatus. When the polarity is set this way, the charge on the filter element 70 repels the solid particles, keeping them away from the filter element and improving the resistance of the filter element to fouling.

Various modifications can be made to the invention described. For example, avoidance of the accumulation of solid particles on the exterior of the filter element can be achieved solely by electrostatic repulsion, without depending upon the formation of gas bubbles by electrolysis. In this case, the shaft 56 can be connected to the D.C. power supply 78 as in FIG. 2, but surrounded by an insulating sheath, so that it is insulated not only from the filter element, but also from the liquid both inside and outside the filter element 70. If the shaft is connected to the positive side of the power supply, while the bowl is connected to the negative side, the exterior of the filter element, which is conductive, will acquire a positive charge by capacitive coupling to the positively charged shaft, and will repel positively charged particles in the liquid surrounding the filter element. As an alternative, the shaft can be directly connected to the filter element, and the inner wall of the bowl can be covered by an insulating material.

Where gas bubbles are formed electrolytically, relatively low voltages, typically in the range of 2.5 to 15 volts, will be used in order to avoid excessive power consumption. However, when insulation is used as described above, higher voltages, in the range of thousands of volts, for example, 5000 volts, can be applied, for more effective electrostatic repulsion.

Other baffle configurations can be utilized to isolate the interior of the filter element from the space between the outside of the filter element and the bowl. Other insulating schemes can be utilized to isolate the filter element electrically from the bowl. Moreover, although the filter element will always be one of the electrodes, the other electrode can be one or more elements separate from, or in addition to the bowl. Deterioration of filter performance can be sensed by flow rate measurement in order to activate the ultrasonic generator or power supply. Alternatively, the ultrasonic generator or power supply can be activated by optical sensing of turbidity of the liquid between the filter and the bowl, or of the filtrate. As a further alternative, the ultrasonic generator and/or the power supply can be operated continuously. The motor can rotate in either direction, and the speed of the motor can be made variable in order to reduce clogging of the filter element while minimizing power consumption. Optionally, the speed of the motor can also be controlled by the controller.

Still other modifications may be made to the apparatus and method described above without departing from the scope of the invention as defined in the following claims.

What is claimed is:

1. Filtration apparatus comprising a bowl having a fluid inlet port, an electrically conductive filter element situated inside the bowl, said filter element being hollow and having an exterior surface and an interior space, and being mounted for rotation about an axis, driving means for rotating said filter element about said axis, a fluid outlet port in communication with the interior of the filter element, a fluid outlet port in communication with a space within said bowl but external to said filter element, an electrode external to said filter element, and an electrical power supply coupled to said electrode, and to said filter element, for establishing an electrical potential difference between said electrode and the exterior surface said filter element.

2. Filtration apparatus according to claim 1, in which said electrode is constituted by an interior wall of said bowl.

3. Filtration apparatus according to claim 1, comprising at least one ultrasonic transducer arranged to direct acoustic energy at an ultrasonic frequency toward said filter element.

* * * * *